(12) United States Patent
Jones et al.

(10) Patent No.: US 6,181,037 B1
(45) Date of Patent: Jan. 30, 2001

(54) ELECTRIC MOTOR CENTRIFUGAL ACTUATOR OVERSPEED GUARD

(75) Inventors: Patrick M. Jones; Nicholas R. Daniels, both of St. Louis, MO (US)

(73) Assignee: Emerson Electric Co., St. Louis, MO (US)

(*) Notice: Under 35 U.S.C. 154(b), the term of this patent shall be extended for 0 days.

(21) Appl. No.: 09/550,978

(22) Filed: Apr. 17, 2000

(51) Int. Cl.$^7$ .................................................. H02K 11/00
(52) U.S. Cl. ........................ 310/68 E; 310/85; 200/80 R
(58) Field of Search ............... 310/68 E, 68 R, 310/89, 67 R, 85; 200/80 R

(56) References Cited

U.S. PATENT DOCUMENTS

| | | | |
|---|---|---|---|
| 2,904,651 | * 9/1959 | Williams | 310/68 E |
| 3,194,078 | * 7/1965 | Larsh | 200/80 R |
| 3,337,704 | * 8/1967 | Golverdinge Schut | 200/80 R |
| 3,609,421 | 9/1971 | Hildebrandt | 310/68 E |
| 3,699,288 | * 10/1972 | Swoveland et al. | 200/80 R |
| 3,852,545 | * 12/1974 | Sakakibara | 200/80 R |
| 4,839,549 | * 6/1989 | Daniels | 310/68 E |

\* cited by examiner

*Primary Examiner*—Burton Mullins
(74) *Attorney, Agent, or Firm*—Howell & Haferkamp, LC

(57) ABSTRACT

An overspeed guard for an electric motor centrifugal actuator closely conforms to the peripheral contour of the component parts of the actuator and prevents the component parts from separating from the centrifugal actuator on overspeed of the actuator.

20 Claims, 3 Drawing Sheets

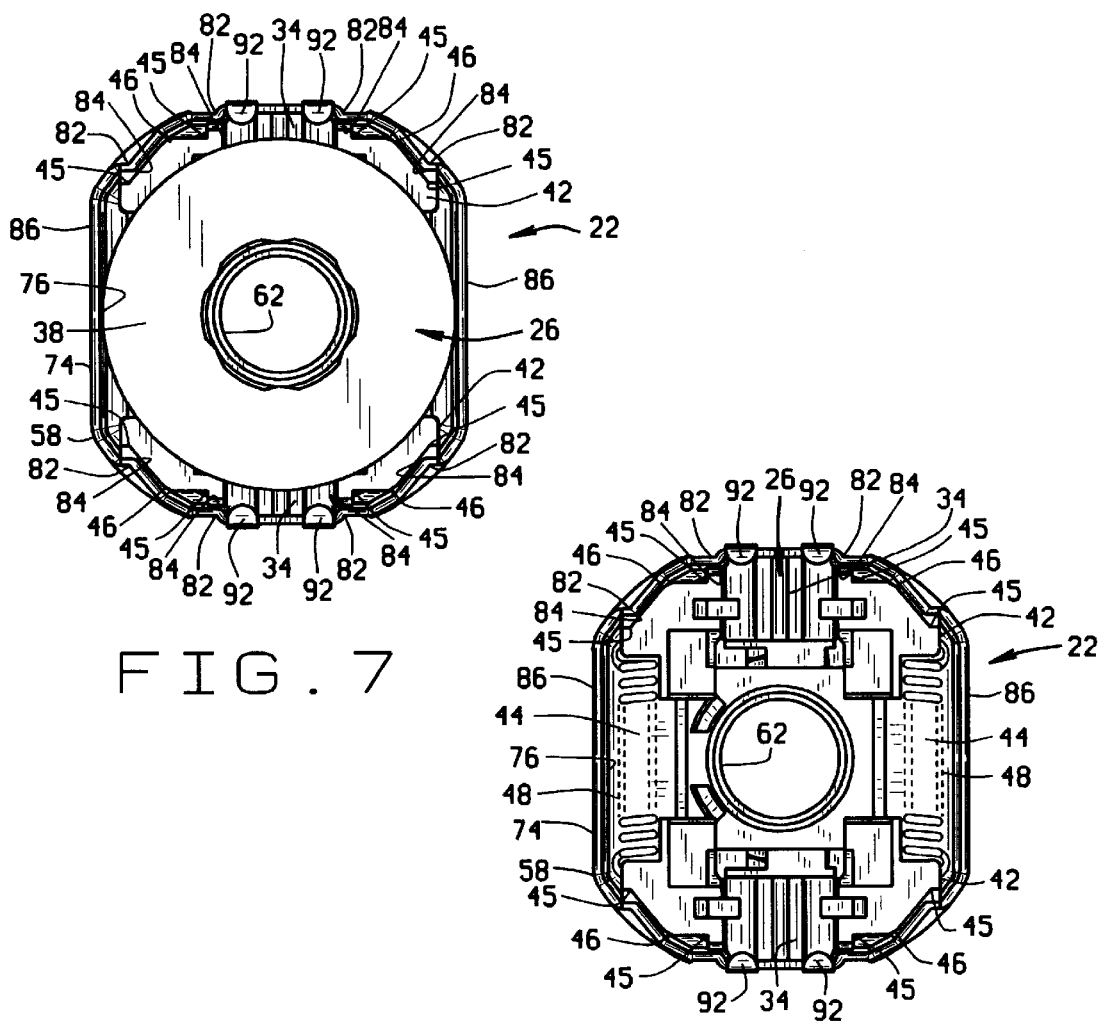
FIG. 7
FIG. 8
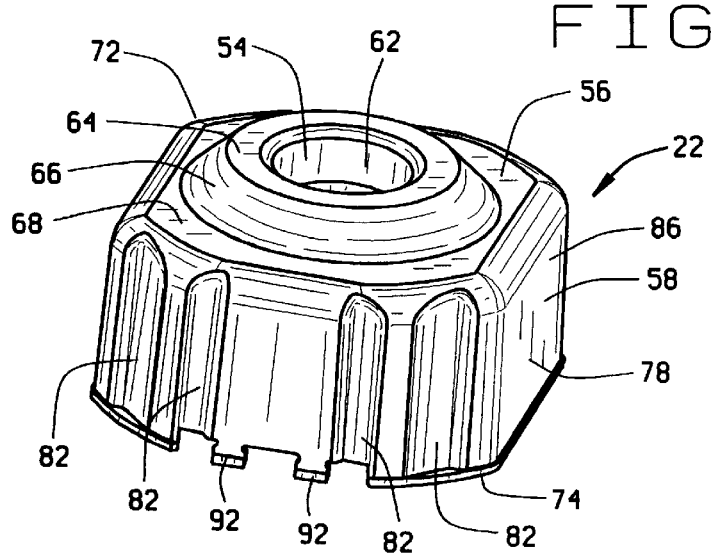
FIG. 6

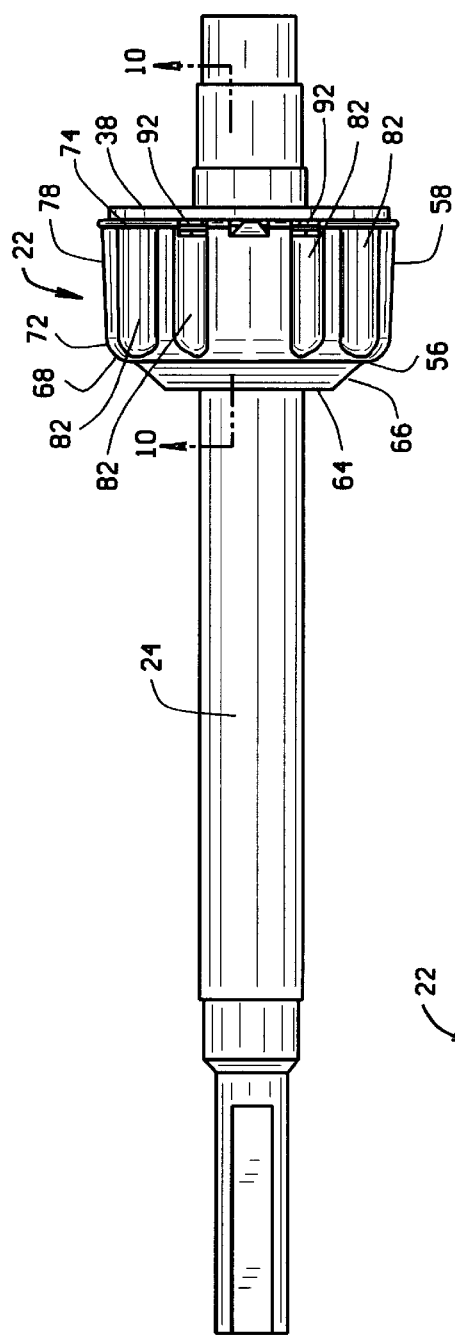
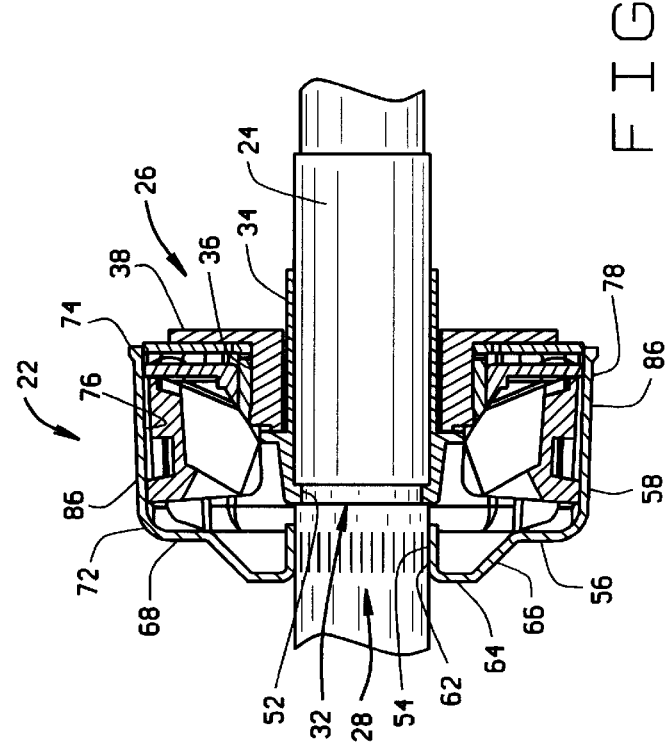

ELECTRIC MOTOR CENTRIFUGAL ACTUATOR OVERSPEED GUARD

BACKGROUND OF THE INVENTION (1) Field of the Invention

The present invention pertains to a centrifugal actuator of an electric motor having an overspeed guard. In particular, the present invention pertains to an overspeed guard for an electric motor centrifugal actuator in which the overspeed guard closely conforms to the peripheral contour of the component parts of the actuator and prevents the component parts from separating from the centrifugal actuator on overspeed of the actuator.

(2) Description of the Related Art

Electric motors having stators with separate start windings and run windings typically employ centrifugal actuators to control the energization of the two windings. The start winding is energized during start up of the motor, or when the speed of the motor falls below a specified operating speed, so as to create a rotating field in the motor stator and to apply sufficient torque to the motor rotor for starting purposes. However, once the motor has accelerated to a desired operating speed, or a pre-determined percentage of the desired operating speed, the rotor is able to follow the alternations of the magnetic field created by the run windings and the start winding is no longer needed. At this point in the motor's operation the centrifugal actuator automatically switches over energization of the start winding to the run winding.

Usually, the start winding is not intended for continuous use and may fail if not de-energized during normal operation of the motor. Conventionally, a switch referred to as a motor starting switch is provided in the motor for energizing the start winding only during start up of the motor and for de-energizing the start winding once the motor has attained its desired operating speed. A centrifugal actuator is typically employed in switching the motor windings between their start winding and run winding. The centrifugal actuator is mounted on the motor shaft for rotation with the shaft, and is responsive to the speed of the motor shaft for switching the windings between the start winding and the run winding, and vice versa.

A typical centrifugal actuator is disclosed in the U.S. Pat. No. 3,609,421, of Hildebrandt, issued Sep. 28, 1971, and assigned to the assignee of the present application and incorporated herein by reference. Basically, the centrifugal actuator includes a main body that is mounted to the electric motor shaft for rotation with the shaft. A sleeve is mounted on the main body for axially reciprocating movement of the sleeve over the main body between first and second positions of the sleeve relative to the shaft. The sleeve has an annular flange that projects radially outwardly from the sleeve. The annular flange is positioned on the shaft adjacent an electric switch. The switch completes a circuit through the start winding and the run winding of the motor in response to the sleeve moving between its respective first and second axially displaced positions on the shaft.

The sleeve and its annular flange are biased toward the first position of the sleeve on the shaft by a pair of springs. The springs extend transversely across opposite sides of the motor shaft and are connected between a pair of levers positioned on opposite sides of the motor shaft. The levers are mounted on the body of the actuator for pivoting movement of the levers relative to the body. Each of the levers are formed as bell cranks having one end connected to the sleeve and the opposite end connected to a weight mounted on the lever. Each of the levers has an intermediate projection that is received in a slot formed in opposite, radially outward portions of the actuator body. The projections engaging in the slots function as the pivot connections of the levers to the body. The pair of springs exert a biasing force on the levers pulling the weighed ends of the levers radially inwardly, and thereby bias the actuator sleeve toward its first position relative to the shaft.

When rotation of the shaft and the centrifugal actuator reaches a pre-determined speed, the centrifugal force exerted on the weighed ends of the levers causes the weighted ends to move radially outwardly against the bias of the pair of springs. This in turn causes the opposite ends of the levers engaging with the actuator sleeve to move the sleeve from its first axial position relative to the shaft to its second axial position relative to the shaft. This movement of the sleeve and its annular flange automatically switches the windings of the stator from energization of the start winding to energization of the run winding of the motor. When the speed of rotation of the shaft falls below the pre-determined speed, the pair of springs pull the weighted ends of the levers radially inwardly, thereby causing the opposite ends of the levers to move the actuator sleeve from its second position relative to the shaft to its first position relative to the shaft. This in turn causes the annular flange of the actuator sleeve to switch the motor windings from energization of the run winding back to energization of the start winding.

Centrifugal actuators of the type described above and disclosed in the above referenced patent are relatively inexpensive to manufacture and, thus are employed on electric motors in many different applications. However, in some applications of electric motors their shafts are at times subjected to increased speeds over that possible by energizing the run winding of the motor, creating an overspeed condition in the centrifugal actuator.

One example of an operative environment in which an overspeed condition of the actuator can occur is in electric motors that drive flexible augers or snakes that are employed in cleaning out pipes, for example cleaning out tree roots from drainage pipes. Augers of this type are basically comprised of a length of flexible cable having a cutting or drilling instrument at one end and the electric motor at the opposite end. The cutting/drilling instrument is pushed through a length of pipe and is rotated by the flexible cable that, in turn, is rotated by operation of the electric motor. Rotation of the cutting/drilling instrument cuts away plant roots that have penetrated the pipe wall and obstruct drainage through the pipe, for example rain water drainage. At times the cutting/drilling instrument will come into contact with a plant root of sufficient size, or other similar obstruction, that it cannot initially cut through completely which stops the rotation of the cutting/drilling instrument in the drain pipe. With the cutting/drilling instrument stopped, the continued rotation of the electric motor shaft causes the flexible cable to wind up in a similar manner to a torsion spring. This will eventually stop the rotation of the motor shaft. When the motor is turned off to withdraw the auger from the pipe, the wound up flexible cable will function as a torsion spring as it unwinds causing the motor shaft to spin in the opposite direction at an increased rate of speed over that of the running speed of the motor. This increased speed of rotation at times causes the centrifugal actuator mounted on the motor shaft to rotate at such a high rate of speed that the levers and springs will fly apart from the actuator body potentially damaging the electric motor and requiring replacement or repair of not only the centrifugal actuator, but also the electric motor.

Attempts at preventing the overspeed condition of the centrifugal actuator from damaging the electric motor have included the development of a plastic cup-shaped guard that is mounted on the motor shaft adjacent the centrifugal actuator with a cylindrical side wall of the guard surrounding the actuator. However, these prior art guards have required more complex tooling and assembly processes which results in higher production costs. What is needed is a lower cost overspeed guard that prevents component parts of the centrifugal actuator from separating from the actuator and potentially damaging the electric motor controlled by the actuator.

SUMMARY OF THE INVENTION

The present invention provides an overspeed guard that is mounted on the shaft of an electric motor around the centrifugal actuator that controls the operation of the motor and prevents component parts of the actuator from separating from the actuator where they can potentially come into contact with and damage the electric motor. In addition, the overspeed guard of the invention is designed to be mounted on the motor shaft in a manner that secures the centrifugal actuator both axially and angularly to the motor shaft, eliminating the need for snap rings that had been employed in securing prior art centrifugal actuators axially to the motor shaft. Still further, the overspeed actuator of the invention is manufactured in a way that reduces its costs of manufacture over that of prior art plastic, extrusion molded actuator guards.

The overspeed guard of the invention is stamped as a single, monolithic piece from sheet metal, thereby reducing its costs of manufacture over that of prior art plastic extrusion molded overspeed guards. The guard of the invention is stamped with a center, cylindrical collar having an interior surface dimensioned to be received in friction engagement on the shaft of the electric motor. A portion of the motor shaft exterior surface is knurled to receive the interior surface of the guard collar in tight friction engagement. An end wall of the guard projects radially outwardly from the collar and the center axes of the collar and the motor shaft. The end wall has a peripheral edge and a side wall of the guard extends from the peripheral edge at an angle relative to the end wall. The side wall has an axial dimension between the end wall peripheral edge and a distal edge of the side wall that is sufficiently large to contain the centrifugal actuator of the motor within the side wall. The side wall has opposite exterior and interior surfaces and a plurality of indentations are formed in the exterior surface creating a plurality of projections that project radially inwardly from the side wall interior surface. The plurality of projections are positioned on the side wall interior surface where they closely follow the exterior contour of the centrifugal actuator levers and springs. The side wall is also formed with a pair of flat sections on opposite sides of the side wall. The side wall flat sections are positioned adjacent the pair of springs connected between the pair of levers on opposite sides of the motor shaft. The side wall also has two pairs of tabs on opposite sides of the side wall that are bent inwardly toward each other and engage over the body of the centrifugal actuator. Together the pairs of tabs and the cylindrical collar of the overspeed guard secure the guard to the shaft and the centrifugal actuator, with the actuator contained inside the side wall.

Because the stamped configuration of the overspeed guard side wall closely conforms to the exterior contour of the centrifugal actuator, should component parts of the actuator fly apart during an overspeed condition their confinement in the side wall of the overspeed guard prevents the component parts from completely separating from the actuator where they could potentially cause damage to the electric motor.

BRIEF DESCRIPTION OF THE DRAWINGS

Further features of the invention are revealed in the following detailed description of the preferred embodiment of the nvention and in the drawing figures wherein:

FIG. 6 is a perspective view of the overspeed guard;

FIG. 7 is a view of the interior of the overspeed guard containing a centrifugal actuator;

FIG. 8 is a view similar to FIG. 7 with the annular flange of the centrifugal actuator removed;

FIG. 9 is a view of the overspeed guard mounted over a centrifugal actuator on a motor shaft; and FIG. 10 is a sectioned view of the overspeed guard and the centrifugal actuator in a plane of line 10—10 of FIG. 9.

DETAILED DESCRIPTION OF THE PREFERRED EMBODIMENT

Figure 1:
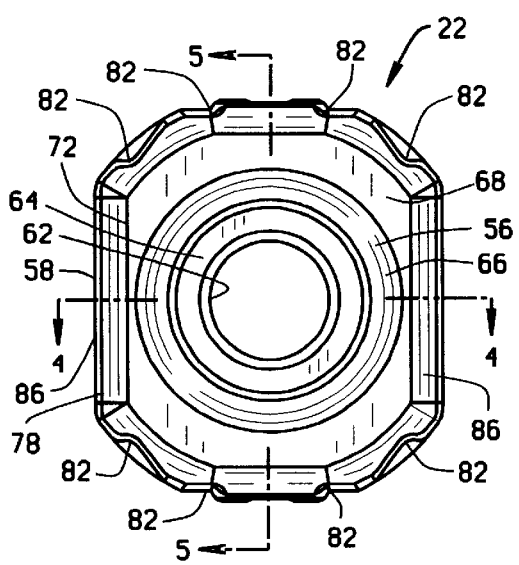
FIG. 1 is a plan view of the exterior of the overspeed guard.
Figure 2:
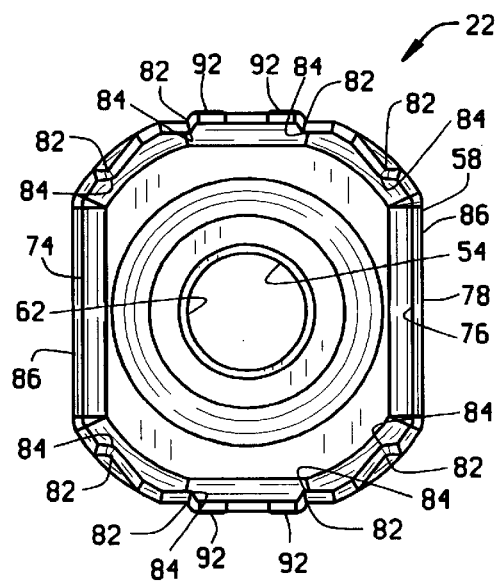
FIG. 2 is a plan view of the interior of the overspeed guard.
Figure 3:
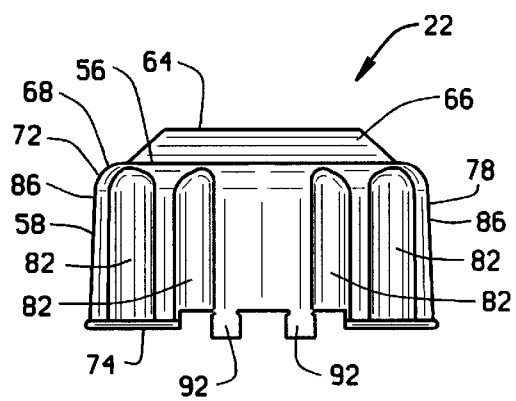
FIG. 3 is a view of the exterior of the overspeed guard.
Figure 4:
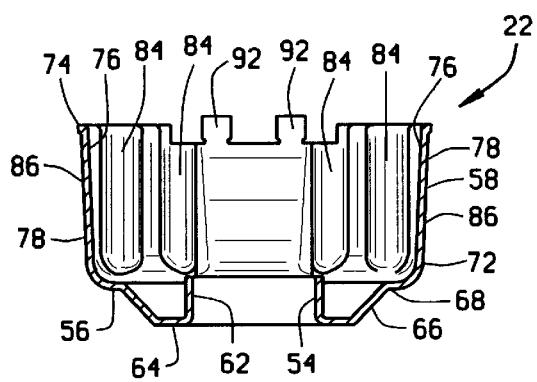
FIG. 4 is a sectioned view of the overspeed guard in a plane of line 4—4 of FIG. 1.
Figure 5:
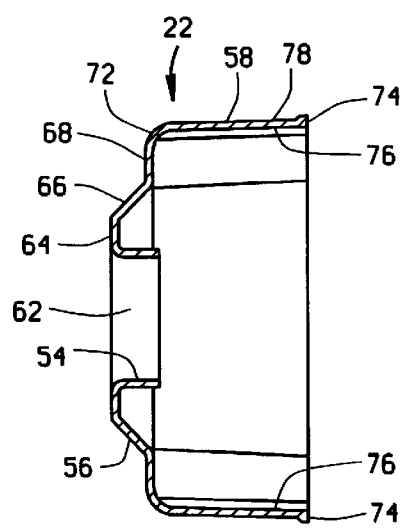
FIG. 5 is a sectioned view of the overspeed guard in a plane of line 5—5 of FIG. 1 (the outlines of the projections and indentations shown in FIG. 4 are omitted in this view for clarity)

The overspeed guard 22 of the present invention is designed to be employed on a rotor shaft 24 surrounding a centrifugal actuator 26, where the shaft and actuator are similar to those of the prior art except for modifications which will be described. However, it should be understood that the overspeed guard 22 of the invention may also be employed on the earlier described prior art rotor shaft surrounding and guarding the prior art centrifugal actuator without the modifications of the shaft and actuator to be described herein. The operative environment of the overspeed guard 22 to be described is not intended to limit use of the overspeed guard to one particular application or in one particular environment.

The overspeed guard 22 is shown mounted on the rotor shaft 24 in FIG. 9. The rotor of the electric motor is not shown on the shaft. The modifications to the rotor shaft are shown in FIG. 10. As seen in FIG. 10, a portion of the rotor shaft 24 has a plurality of knurls formed around the shaft. The knurls 28 are employed in providing a tight friction fit of the overspeed guard 22 on the shaft as will be explained. In addition, the shaft is provided with an annular groove 32 that extends around the shaft in a position on the shaft adjacent the knurls 28. Prior art rotor shafts also employed annular grooves that would receive c-rings employed in securing centrifugal actuators and overspeed guards in axial positions on the shafts. However, the annular groove 32 formed in the rotor shaft 24 shown in FIG. 10 is not provided to receive a c-ring and is positioned on the shaft to maintain the centrifugal actuator 26 in its axial position on the shaft in a manner to be explained. Apart from the knurls 28 and the adjacent annular groove 32 of the shaft 24, the shaft is basically the same as those employed in various different types of electric motors in supporting a rotor (not shown) of the motor.

The centrifugal actuator 26 shown in FIGS. 7 through 10 is substantially the same as prior art centrifugal actuators. Like the prior art centrifugal actuator described earlier, the centrifugal actuator shown in FIGS. 7 through 10 includes a main body 34 mounted to the rotor shaft 24 for rotation with the shaft. A sleeve 36 is mounted on the main body 34 for axially reciprocating movement relative to the shaft. The sleeve 36 has an annular flange 38 that projects radially outwardly from the sleeve. As the sleeve 36 and annular flange 38 reciprocate axially on the shaft, the flange operates the start winding and run winding switch (not shown) of the motor as explained earlier.

The pair of weighted levers 42 are mounted on the actuator main body 34 on opposite sides of the shaft as seen in FIGS. 7 and 8. A pair of springs 44 extend transversely across opposite sides of the motor shaft and are connected between the pair of weighted levers 42. The earlier described construction of the weighted levers 42 as bell cranks with one arm being operatively connected to the actuator sleeve 36 and the opposite arm being a weighted arm gives the weighted levers an exterior configuration shown in FIGS. 7 and 8. The springs 44 and levers 42 give the actuator an exterior contour defined by the recesses 45 and protrusions 46 in the radially outer edges of the weighted levers and the exterior configurations 48 of the pair of springs. This exterior contour of the actuator can best be seen in FIG. 8. In FIG. 8 the pair of weighted levers 42 are in their second, radially extended positions described earlier. When the levers 42 are moved to their retracted, first positions by the bias of the springs 44 the exterior edges of the levers are moved slightly radially inwardly from the positions of the edges shown in FIG. 8.

A portion of the actuator main body 34 is provided with a radially inwardly extending annular rim 52 that engages in the annular groove 32 of the rotor shaft as shown in FIG. 10. The engagement of the rim 52 in the groove 32 secures the actuator in an axially set position on the rotor shaft 24. As shown in FIG. 10, the actuator 26 is easily slip fit over one end of the shaft 24 and is moved axially along the shaft until the annular rim 52 snaps into engagement with the shaft annular groove 32, thus properly positioning and securing the actuator on the shaft.

In its preferred embodiment, the overspeed guard 22 of the invention is stamped as a single, monolithic piece from sheet metal. This reduces its cost of manufacture over that of prior art plastic extrusion molded overspeed guards. The guard is stamped with its basic parts including a center cylindrical collar 54, an annular end wall 56 and a side wall 58 projecting outwardly from the end wall 56 at an angle relative to the end wall.

The cylindrical collar 54 is formed with a cylindrical interior surface 62 around a center hole of the guard. The collar interior surface has an interior diameter that is dimensioned to provide a tight friction fit of the collar interior surface 62 around the knurled portion 28 of the rotor shaft 24 when the guard 22 is slip fit on the shaft. This dimensioning of the collar interior surface 62 enables the overspeed guard 22 to be secured in position on the shaft by the engagement between the interior surface and the knurls 28 without the need for additional fasteners such as the retainer rings required in the prior art. As seen in FIG. 10, the collar 52 is given an axial dimension that corresponds to the axial length of the portion of the rotor shaft 24 on which the knurls 28 are formed.

The annular end wall 56 extends radially outwardly from the cylindrical collar 54. A first portion 64 of the end wall extends radially outwardly from the collar 54 and is oriented perpendicular relative to the collar. A second portion 66 of the end wall then continues radially outwardly from the first portion 64 but tapers axially over the collar 54. A third portion 68 of the end wall then extends radially outwardly from the end wall second portion 66 and is also oriented perpendicular to the collar 54. The end wall third portion 68 extends radially outwardly to a perimeter edge 72 of the end wall that bends or curves into the side wall 58 of the guard. The axial taper of the end wall second portion 66 positions the collar 54 of the guard outside or to the left of the end wall third portion 68 and the end wall perimeter edge 72 so that the collar 54 does not occupy any of the space within the guard side wall 58 that receives the centrifugal actuator 26 as shown in FIG. 10.

In the preferred embodiment, the side wall 58 is tubular and extends completely around the perimeter edge 72 of the end wall. The side wall 58 extends axially from the end wall perimeter edge 72 to a distal edge 74 of the side wall. The axial length of the side wall is dimensioned sufficiently large to accommodate the centrifugal actuator within the side wall. The side wall distal edge 74 is turned or bent slightly radially outwardly forming the distal edge as a flange that reinforces the edge of the side wall. The side wall has an interior surface 76 and an opposite exterior surface 78. A plurality of indentations 82 are formed in the exterior surface 78 and in turn form projections 84 on the interior surface 76. The indentations 82 run substantially the entire axial length of the side wall and thus function as flutes that reinforce the side wall. In addition, the positioning of the indentations 82 in the exterior surface of the side wall and their corresponding projections 84 on the interior surface of the side wall are determined so that the projections 84 closely conform to the exterior contour of the centrifugal actuator. This can be seen in FIGS. 7 and 8 where the indentations 82 and their corresponding projections 84 are positioned adjacent the recesses 45 and between the protrusions 46 of the actuator levers and thus follow the exterior contour of the lever exterior edges. With the weighted levers 42 on opposite sides of the shaft being the same, the indentations 82 and projections 84 give the side wall a configuration that is symmetric on opposite sides of the rotor shaft 24. In addition, the guard side wall is provided with two flat, parallel sections 86 positioned adjacent the pair of actuator springs 44 and that follow the exterior contour of the springs as best seen in FIG. 8. The flat side wall sections 86 are parallel planar sections of the side walls that do not include any of the indentations 82 or projections 84. Also separating the indentations and projections of the side wall are two pairs of bendable tabs 92 on opposite ends of the side wall. As seen in FIGS. 7 and 8, the pairs of tabs 92, are bent over and engage against a portion of the actuator main body 34. The tabs 92, together with the guard collar 54, secure the guard in a stationary position relative to the actuator 26 and the rotor shaft 24 without the need for additional retainer rings. The tabs 92 and the actuator annular rim 52 also function together in securing the actuator 26 against axial and angular movement in a stationary position on the rotor shaft 24 without the need for an additional c-ring. The tabs 92 together with the side wall 58, the end wall 56 and the collar 54 of the guard are all stamped as a single, monolithic piece from sheet metal.

Because the stamped configuration of the overspeed guard side wall 58 closely conforms to the exterior contour of the centrifugal actuator 26, should component parts of the actuator over extend from their intended range of movement during an overspeed condition their radial movement away from the rotor shaft 24 is limited by the small spacing between the exterior configuration of the weighted levers 46 and the exterior configuration of the springs 48 and the interior surface 76 of the guard side wall 58. With the component parts of the actuator being confined in the guard 22 and their radial movement away from the shaft being very limited, the guard 22 of the invention prevents the component parts of the actuator from completely separating from the actuator in an overspeed condition where the parts could potentially cause damage to the electric motor.

While the present invention has been described by reference to specific embodiments, it should be understood that modifications and variations of the invention may be constructed without departing from the scope of the invention defined in the following claims.

What is claimed:

1. An overspeed guard for a centrifugal actuator mounted on a rotatable shaft, the overspeed guard comprising:

an end wall having an outer perimeter edge and a center hole dimensioned to receive the rotatable shaft, a side wall extending from the perimeter edge of the end wall at an angle relative to the end wall, the side wall having an exterior surface and an interior surface, the interior surface having a plurality of projections that project inwardly from the side wall toward the center hole of the end wall and the projections are positioned on the side wall interior surface where the projections will follow an exterior contour of a centrifugal actuator positioned inside the side wall.

2. The overspeed guard of claim 1, wherein:

the exterior surface of the side wall has a plurality of indentations formed therein opposite the plurality of projections on the side wall interior surface.

3. The overspeed guard of claim 1, wherein:

the center hole of the end wall has a center axis and the side wall is symmetric on opposite sides of a plane containing the center axis.

4. The overspeed guard of claim 1, wherein:

the side wall extends from the perimeter edge of the end wall to a distal edge of the side wall and the side wall is dimensioned sufficiently large between the end wall perimeter edge and the side wall distal edge to contain a centrifugal actuator inside the side wall between the end wall perimeter edge and the side wall distal edge.

5. The overspeed guard of claim 1, wherein:

the side wall has a pair of bendable tabs that project from the side wall on opposite sides of the center hole.

6. The overspeed guard of claim 1, wherein:

the side wall has two pairs of bendable tabs that project from the side wall on opposite sides of the center hole.

7. The overspeed guard of claim 1, wherein:

the end wall and side wall are one monolithic piece of stamped metal.

8. The overspeed guard of claim 1, wherein:

a cylindrical collar extends from the end wall and surrounds the center hole, the cylindrical collar has an interior surface with an interior diameter that is dimensioned to receive the shaft of the centrifugal actuator in tight, friction engagement.

9. The overspeed guard of claim 8, wherein:

the collar is contained inside the side wall.

10. The overspeed guard of claim 8, wherein:

the end wall, the side wall and the collar are one monolithic piece of stamped metal.

11. The overspeed guard of claim 1, wherein:

the side wall extends around the perimeter edge of the end wall and has two sections on opposite sides of the center hole that do not have any of the plurality of projections, where the plurality of projections are positioned on the side wall entirely between the two sections of the side wall.

12. The overspeed guard of claim 11, wherein:

the two sections of the side wall are flat.

13. The overspeed guard of claim 12, wherein:

the side wall has two pairs of bendable tabs that project from the side wall on opposite sides of the center hole and each pair of bendable tabs is positioned on the side wall between the two sections of the side wall.

14. The overspeed guard of claim 11, wherein:

the two sections of the side wall are parallel planes.

15. A centrifugal actuator overspeed guard comprising:

a shaft having an axis of rotation;

a centrifugal actuator mounted on the shaft for rotation with the shaft, the centrifugal actuator having an exterior contour; and an end wall mounted on the shaft for rotation with the shaft, the end wall having an outer perimeter edge, a side wall extending from the perimeter edge at an angle relative to the end wall, the side wall having an exterior surface and an interior surface that surrounds the centrifugal actuator, the interior surface having a plurality of projections that project inwardly from the side wall toward the axis of the shaft and the projections are positioned on the side wall interior surface where the projections follow the exterior contour of the centrifugal actuator.

16. The overspeed guard of claim 15, wherein:

the centrifugal actuator has a body mounted on the shaft for rotation with the shaft, a pair of weighted levers mounted on the body for movement between first and second positions of the pair of weighted levers relative to the body, and a pair of springs connected between the pair of weighted levers for biasing the levers to their first positions, the pair of levers and the pair of springs define the exterior contour of the centrifugal actuator and the plurality of projections on the side wall project inwardly toward the pair of levers.

17. The overspeed guard of claim 16, wherein:

the side wall has two sections on opposite sides of the centrifugal actuator that do not have any of the plurality of projections and the two sections are positioned adjacent the pair of springs.

18. The overspeed guard of claim 17, wherein:

the side wall has at least one pair of tabs on opposite sides of the side wall and the pair of tabs bend over and engage with the centrifugal actuator body securing the side wall to the body.

19. The overspeed guard of claim 18, wherein:

a cylindrical collar extends from the end wall and engages around the shaft securing the end wall to the shaft.

20. The overspeed guard of claim 19, wherein:

the end wall, the side wall, the pair of tabs and the collar are one monolithic piece of stamped metal.

* * * * *